United States Patent [19]
Fritzsche et al.

[11] 3,805,977
[45] Apr. 23, 1974

[54] MOBILE ASW TARGET HANDLING KIT

[75] Inventors: Herbert J. Fritzsche, Glen Mills; William D. Broadley, Lansdowne, both of Pa.

[73] Assignee: The United States of America as represented by the Secretary of the Navy, Washington, D.C.

[22] Filed: July 27, 1972

[21] Appl. No.: 275,603

[52] U.S. Cl. ............... 214/86 R, 214/75 H, 104/91, 244/137 R
[51] Int. Cl. ............................................. B64c 1/22
[58] Field of Search... 214/75 H, 518, 86 R, DIG. 3, 214/DIG. 4, 84; 212/10, 11, 18, 23; 104/89, 91; 244/137 R

[56] References Cited
UNITED STATES PATENTS

| | | | |
|---|---|---|---|
| 1,188,932 | 6/1916 | Griffith | 214/DIG. 3 |
| 1,910,026 | 5/1933 | Lima | 214/75 H |
| 3,572,513 | 3/1971 | Tantlinger | 214/75 H X |
| 3,211,306 | 10/1965 | Nissen et al. | 214/75 H |

FOREIGN PATENTS OR APPLICATIONS

| | | | |
|---|---|---|---|
| 173,706 | 12/1960 | Sweden | 214/75 H |

*Primary Examiner*—Albert J. Makay
*Attorney, Agent, or Firm*—R. S. Sciascia; Henry Hansen

[57] ABSTRACT

A demountable apparatus for installation in the cargo compartment of an aircraft including fixed wing and helicopters comprising, a rigid supporting frame structure to which is attached a hoisting winch for lifting a captured, torpedo-like body to a first position adjacent an opening in the aircraft; a longitudinal-overhead beam along which moves an articulated power-driven carrier which, in combination with roller guides at the opening, pivots and moves the hoisted body from a vertical alignment at the position adjacent the aircraft opening to a horizontal stowage alignment at a second position on a pair of supporting cradles inside the aircraft. Means are provided for positively securing the body in position on the cradles. The carrier and rollers are utilized in a reverse procedure for unloading the body from the aircraft while hovering or while on the ground.

12 Claims, 10 Drawing Figures

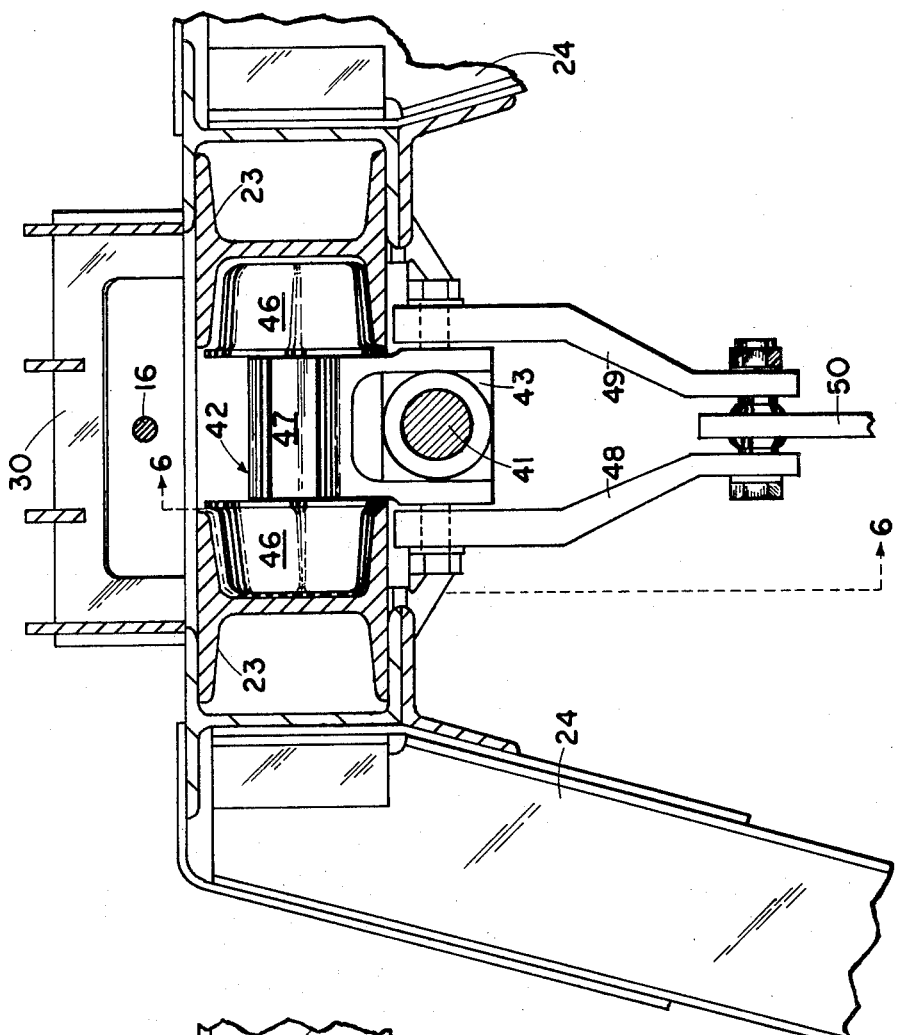
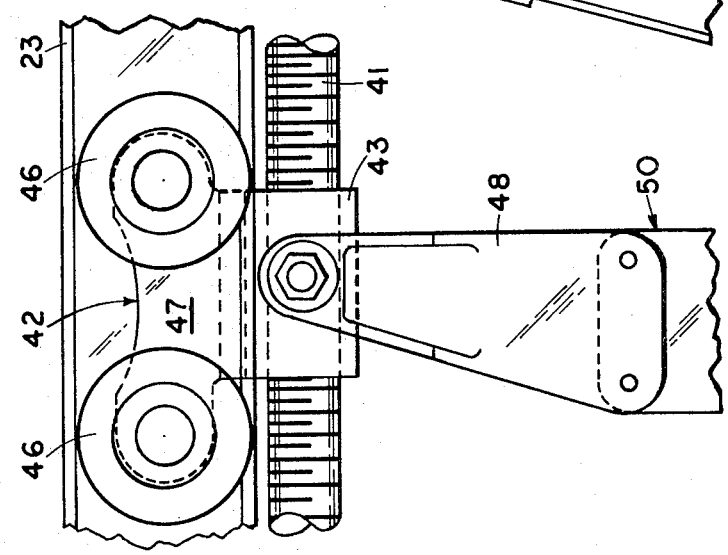

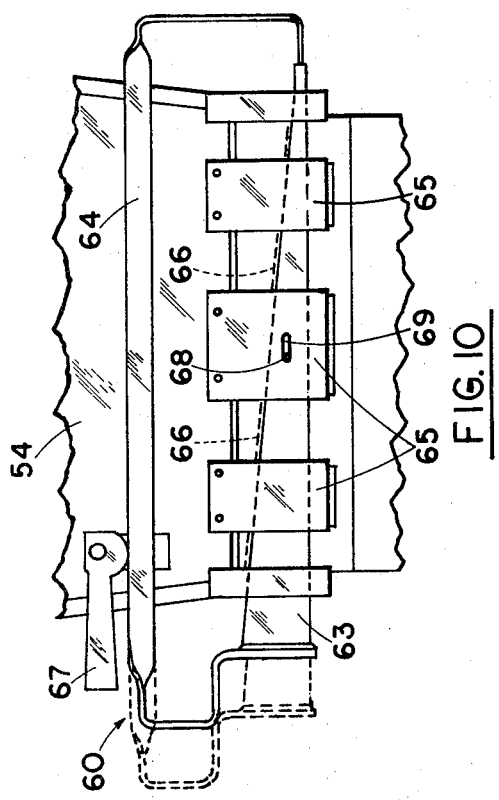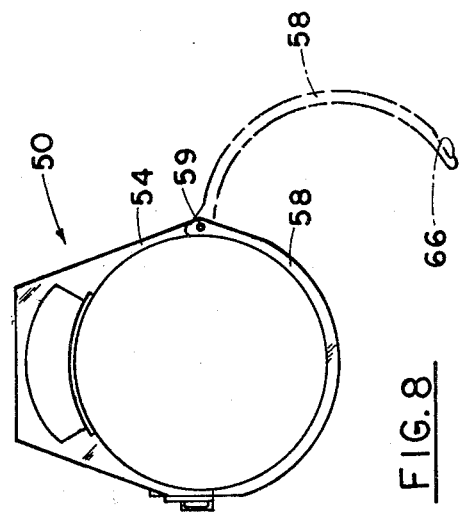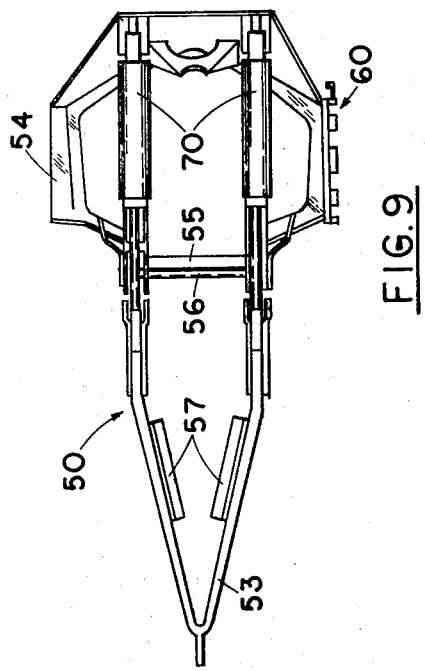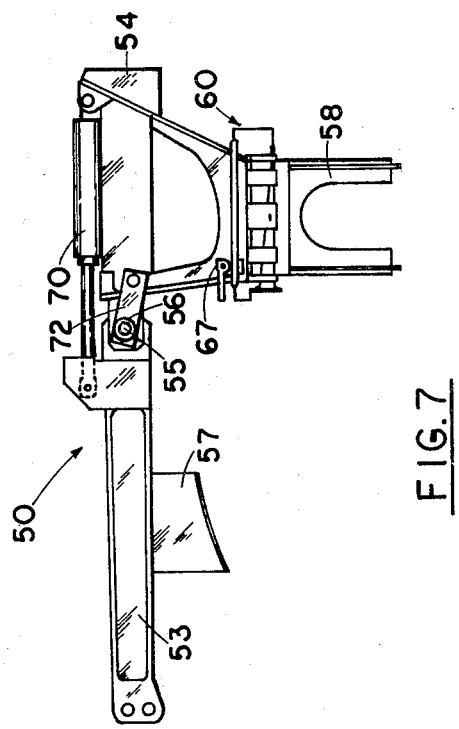

MOBILE ASW TARGET HANDLING KIT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates generally to the field of aircraft cargo handling apparatus and more particularly to mobile apparatus for handling of elongated objects such as an ASW (antisubmarine warfare) target. Whereas the prior art appears to be limited to permanent cargo handling installations in fixed wing aircraft, the present invention, being in a modular or integral form and thus mobile, is suitable for installation in any form of aircraft including fixed wing or helicopters. One of the novel features of the present invention lies in its ability to handle large, awkward objects in a mechanized fashion, as for example from a hovering helicopter, in contradistinction to previous cargo handling systems which are only suitable for handling cargo on the ground. These previous systems are less suitable for installation in aircraft such as helicopters because of their size and immobility. The mobile or portable feature of the present invention renders it particularly useful for aircraft, such as the UH-46 helicopter, which generally must perform more than a single function.

The present invention provides a compact, efficient, mechanized, mobile handling apparatus for capturing, lifting, stowing, and off-loading cargo such as an elongated ASW target. However, the basic features of the invention are adaptable for any type of cargo handling with the convenient modification of stowage facilities.

SUMMARY OF THE INVENTION

Accordingly, it is a general purpose and object of the present invention to provide a demountable cargo handling apparatus for use in aircraft.

It is a further object to provide a modular and mobile apparatus for installation in a helicopter to handle cargo while hovering.

It is yet another object to provide a mobile apparatus for handling elongated objects such as an ASW target.

Briefly, these and other objects are accomplished according to the invention by an apparatus comprising a rigid supporting frame structure, attached to an aircraft cabin floor, which carries a hoisting winch for lifting a captured elongated body to a first position adjacent an opening in a hovering aircraft or an aircraft on the ground. An operator/crewman located on a pulpit assembly mounted to the aircraft frame attaches a carrier to the body, which carrier is attached to a transport dolly that moves along a longitudinal-overhead beam and is powered by a drive system consisting of a reversing rotary ball screw driving a traveling nut. Roller guides connected to the aircraft frame and extending outward from an opening in the hovering aircraft serve as pivot points about which the hoisted body rotates from a vertical alignment at the first position to a horizontal stowage alignment at a second position on a pair of supporting cradles attached to the aircraft cabin floor. The carrier, which is capable of pivoting at its connection to the transport dolly and intermediate along its longitudinal axis, transports the body forward for stowage within the aircraft. Means are provided for positively securing the body in position on a pair of supporting cradles attached to the aircraft cabin floor. The carrier and rollers operate in a reverse procedure for unloading the body from the aircraft while hovering or while on the ground.

BRIEF DESCRIPTION OF THE DRAWINGS

FIG. 5 represents an enlarged partial cutaway cross-sectional view taken along the line 5—5 of FIG. 2 showing a drive system and overhead beam;

FIG. 6 represents a cross-sectional view taken along the line 6—6 of FIG. 5 showing a portion of the drive system and overhead beam;

FIG. 7 represents a side view of a carrier in the apparatus of FIG. 2;

FIG. 8 represents an end view of the carrier of FIG. 7 showing the method of acquiring and clamping the body;

FIG. 9 represents a top view of the carrier of FIG. 7; and

FIG. 10 represents an enlarged view of a locking bar assembly on the carrier of FIG. 7.

DESCRIPTION OF THE PREFERRED EMBODIMENT

Figure 1:
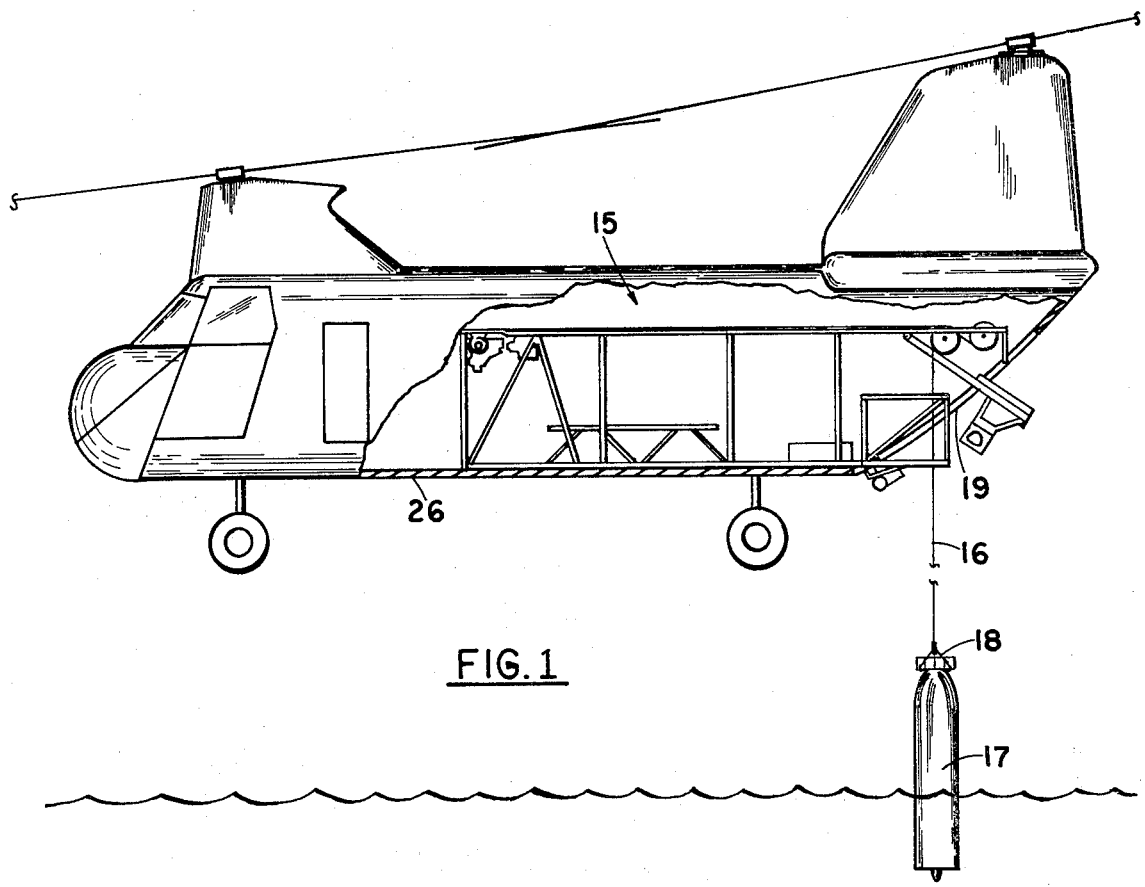
FIG. 1 represents an overall view of a cargo handling apparatus in the fuselage of a hovering aircraft, with an elongated body shown in a captured position in water.

Referring now to the embodiment of FIG. 1, a UH-46 helicopter is shown hovering over water with a mobile cargo handling apparatus 15 installed in its fuselage. A cable 16 is attached to a target 17 at the surface of the water depicting a general method of capture. It should be noted that any elongated or torpedo-like object could be similarly captured in some convenient manner while remaining within the scope and spirit of the present invention. Target 17 is fitted with a protrusion at its forward end to which is attached a grapple 18 connected to the end of cable 16. The helicopter ramp and door have been removed to form a large opening 19 in the aft end for receiving the apparatus 15 and through which target 17 may be brought into the helicopter. Recovery and stowage of target 17 will be more fully described.

Figure 4:
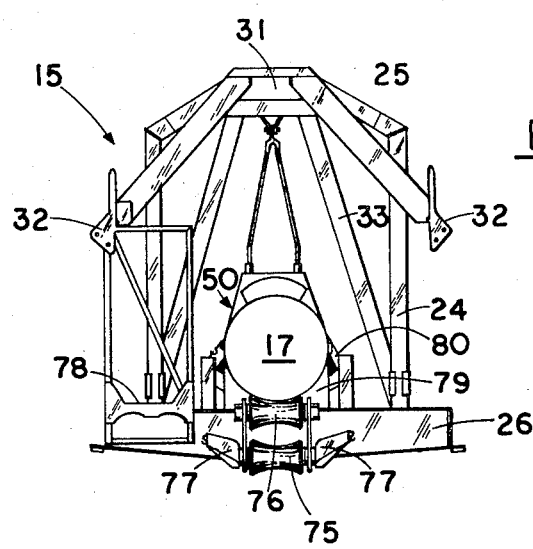
FIG. 4 represents an elevational view of the apparatus of FIG. 2 looking forward.
Figure 2:
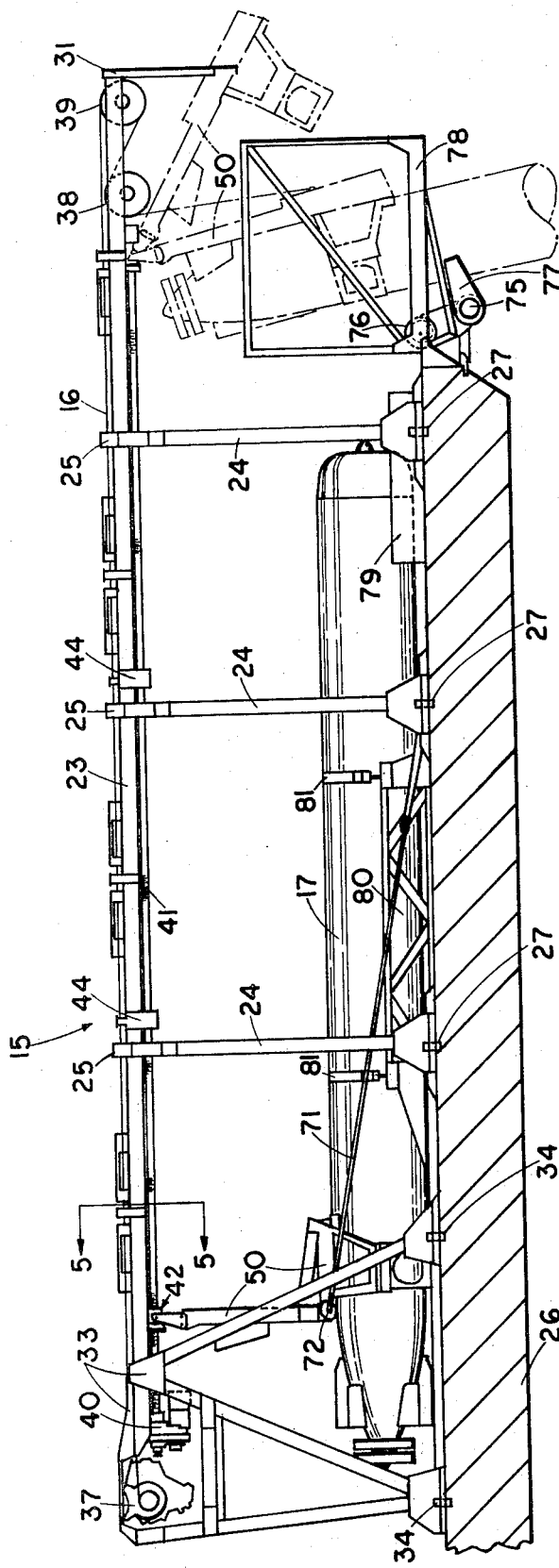
FIG. 2 represents in more detail an enlarged elevational view of the apparatus of FIG. 1, with the body shown in its final stowed position as well as an intermediate position.
Figure 3:
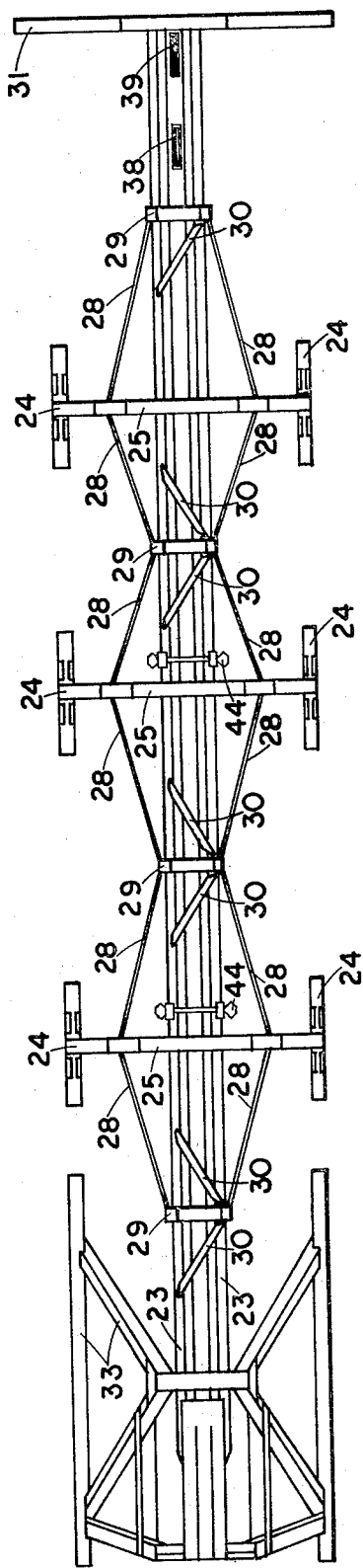
FIG. 3 represents a top view of selected structure of the apparatus of FIG. 2.

Referring now to FIGS. 2, 3 and 4, apparatus 15 comprises two parallel overhead I-beams 23 of standard aluminum extrusions located about the center-line of the helicopter. Beams 23 are supported vertically along their length by a plurality of intermediate stanchions 24 connected to attachment pad segments 25 positioned transverse to the longitudinal axis of beams 23 and attached thereto. Stanchions 24 are secured to a helicopter cabin floor 26 by a plurality of quick disconnect cleats 27. Fore and aft stability of segments 25 is ensured by a plurality of tubular struts 28 anchored at their respective one ends to segments 25 and at their respective opposite ends to a plurality of braces 29 formed to be secured transversely to beams 23 and positioned intermediate thereon. Torsional stability of beams 23 is provided by a plurality of ribs 30 formed to be attached diagonally across beams 23 adjacent braces 29. Vertical target hoisting loads are transferred into the helicopter frame (not shown) by an aft frame assembly 31 connected to beams 23 in some convenient manner (not shown). Mounting brackets 32, mounted to aft frame assembly 31, are attached to the helicopter frame. A forward truss assembly 33 for transferring horizontal loads into the helicopter frame is attached to beams 23 by a fitting (not shown) and anchored to cabin floor 26 by a plurality of quick disconnect cleats 34.

Recovery of target 17 is accomplished by a winch 37 mounted on truss 33 with cable 16 extending the entire length of beams 23 around a pair of sheaves mounted in tandem on the aft end of beams 23. Cable 16 extends around the aft side of sheave 39, back over the forward side of sheave 38, and down for hoisting. A motor 40 mounted on truss 33 drivingly rotates a screw 41 supported by screw supports 44 spaced along the screw length producing fore and aft translation of a dolly 42 having a nut 43 affixed therein cooperating with the threads of screw 41.

Referring now to FIGS. 5 and 6, nut 43 is captively contained within and drives dolly 42 which rolls on the inner flanges of beams 23 by means of four rollers 46 rotatingly connected to a dolly frame 47. Links 48 and 49 are pivotally connected to frame 47 at their respective tops and formed to be connected to a carrier 50 at the bottoms.

Referring to FIGS. 2 and 4 carrier 50 is formed to grip target 17 to transport it laterally within the helicopter. Carrier 50 is shown in three positions, fully forward in the horizontal stowed position, and fully aft (phantom) clamped to target 17 or rotated sufficiently upward to allow target 17 to enter the aft cabin area.

Referring to FIGS. 7, 8 and 9, carrier 50 comprises a yoke 53 formed to be attached to links 48 and 49 of dolly 42 at one end as shown in FIG. 5, and pivotally connected at the other end to an upper saddle half 54 by means of a pin 55 and a bolt 56. Two contoured pads 57 are mounted on yoke 53 extending outward therefrom to cushion and position the forward end of target 17 during transfer from cable 16 as shown in FIG. 2. Upper saddle half 54 is hinged to a lower saddle half 58, which pivots about a hinge pin 59 to an open position for accepting target 17. Target 17 is securely gripped by rotating lower saddle half 58 closed and latching it by means of locking bar assembly 60.

With reference to enlarged FIG. 10, locking bar assembly 60 comprises a sliding tapered wedge 63 integrally attached in some convenient manner to a slidable bar 64. Wedge 63 is supported by and slides on a plurality of L-shaped members 65 formed to be attached to upper saddle half 54. Latching is accomplished by forcing bar 64 inward, butting wedge 63 against member 65 and engaging a lip 66 on lower saddle half 58. Retention is assured by clamping action of a cam 67, pivotally connected to upper saddle half 54, on bar 64, and by a retaining pin 68 in slot 69. Variation in target body diameter is provided for by the taper of wedge 63.

Referring now to FIG. 7, a pair of dash pots or viscous dampers 70, mounted at their one ends on upper saddle half 54 and at their other ends on yoke 53, permit a controlled rotation of target 17 in apparatus 15 of FIG. 2 by internal metering orifice means (not shown). As carrier 50 moves forward, it pivots internally about pin 55 until yoke 53 assumes a vertical position perpendicular to upper and lower saddle halves 54 and 58 respectively. When carrier 50 has moved fully forward to the horizontal stowed position, further movement is restricted by attachment of a restraint harness 71 to a rectangular tie-down lug 72, rotatingly attached at one end to pin 55 and at the other end to upper saddle half 54.

Referring now to FIGS. 2 and 4 lower and upper roller guides 75 and 76 respectively, attached in some convenient manner to the helicopter frame, provide a pivot about which target 17 rotates into the cabin area. Roller guides 75 and 76 are contoured to receive the cylindrical target body and have an elastomeric coating to minimize damage and absorb the dynamic energy of target-roller contact. A pair of arms 77 on lower roller guide 75 position target 17 laterally during manual transfer from cable 16 to carrier 50. A pulpit 78 is mounted to the helicopter frame in the aft ramp area in some convenient manner to provide an operator/crewman (not shown) with a platform for assisting in capture, recovery and transfer of target 17 from cable 16 to carrier 50. Pulpit 78 is offset from the centerline of apparatus 15 in order not to interfere with the motion of target 17. Controls (not shown) to operate winch 37 and motor 40 can be placed in any convenient location in the helicopter, such as for example on pulpit 78.

Upon completion of target transfer, carrier 50 advances rotating target 17 from a vertical to a horizontal position. At final stowed position target 17 is supported by a stationary cradle 79 at its aft end and an adjustable cradle 80 at its forward end. Cradles 79 and 80 are demountably attached to cabin floor 26 in some convenient manner. Cradle 79 is coated with a slidable material to reduce friction during forward motion of target 17. Target 17 is secured from movement during flight by two straps 81 located and secured fore and aft on cradle 80 and by restraint harness 71 affixed to tie-down lug 72 on carrier 50 and to cabin floor 26.

Operation of apparatus 15 will now be summarized with reference to FIGS. 2 and 4. Target 17 is hoisted from the water by grapple 18 connected to cable 16 powered by winch 37 actuated by control means (not shown) to a vertical position adjacent lower roller guide 75. An operator/crewman (not shown) stationed on pulpit 78 manually transfers target 17 from cable 16 to carrier 50 (shown in phantom), which is rotatable by the operator/crewman. Motor 40 is actuated by control means (not shown) driving screw 41 and causing carrier 50 to advance. Target 17 contacts successively lower roller guide 75 and upper roller guide 76 pivoting from a vertical to a horizontal position within the helicopter cabin. As target 17 rotates and advances, its center of gravity progresses to a position forward of upper roller guide 76. The unbalanced weight creates a tendency for the forward end to fall or flop down rapidly. Carrier 50 pivots internally about pin 55 compressing viscous dampers 70 to absorb any shock of sudden target movement and permit a controlled rate of rotation of target 17. In the fully rotated position carrier 50 assumes an L-shape, as shown in the forward position in FIG. 2. The forward end of target 17 contacts stationary cradle 79, which both supports and guides it during continued forward movement to its final stowed position with its body resting on adjustable cradle 80 and stationary cradle 79.

For off-loading, the immediately described above procedure is reversed, whereby target 17 is moved aft by carrier 50 until it rotates to a vertical position adjacent lower roller guide 75. The operator/crewman manually transfers target 17 to cable 16, which is lowered by winch 37 into the water or onto the ground.

Some of the many advantages of the present invention should now be apparent. The cargo handling apparatus described herein provides a compact, mobile and mechanized means for loading and unloading elongated objects, such as an ASW target, in an aircraft while hovering or on the ground. It can be disassembled for easy transport when not in use, and reassembled with a minimum of effort. It is also readily adaptable to handling cargo of varying shapes and sizes. Therefore, it should be understood that the foregoing disclosure relates to only one embodiment of the present invention and that numerous modifications and variations may be made therein without departing from the spirit and scope of the invention as set forth in the appended claims.

What is claimed is:

1. A cargo handling apparatus suitable for transporting an elongated object comprising:
   a frame formed to be detachably mounted to a support structure;
   a beam operatively supported by said frame;
   lifting means connected to said frame for raising the object to a vertical position adjacent to one end of said beam;
   traversing means including trolley means depending from said beam for transporting the object along the length thereof and carrier means having a yoke pivotally connected at one end thereof to said trolley means in a vertical plane and saddle means for gripping the object, pivotally attached to the other end of said yoke for angular movement within said plane; and
   roller means formed to be connected to the structure and extending outward therefrom below said one end of said beam for providing a fulcrum about which the object can rotate when transported along the length of said beam whereby the object is retrievable from an unsecured position to a secured position in the support structure.

2. A cargo handling apparatus as set forth in claim 1, further comprising:
   said traversing means including a screw operatively connected to said beam and extending along the length thereof and a motor drivingly connected to said screw, said trolley means being threadingly engaged to said screw for traversing the length thereof.

3. A cargo handling apparatus as set forth in claim 2, further comprising:
   said carrier means including dash pot means operatively attached between said yoke and saddle means for controlling the rate of pivoting and for limiting the angular movement of said saddle means between an extended position and an orthogonal position toward said one end of said beam.

4. A cargo handling apparatus as set forth in claim 3, further comprising:
   said saddle means including an upper section and a lower section hingedly connected to said upper section for gripping the object.

5. A cargo handling apparatus as set forth in claim 4, further comprising:
   said upper section including locking means having a slidable wedge at the distal end; and
   said lower section including a lip formed to register with said wedge for positive locking contact.

6. A cargo handling apparatus as set forth in claim 2, further comprising:
   said lifting means including a winch attached to said frame, sheave means operatively connected adjacent to said one end of said beam, a cable operatively extending from said winch around said sheave means, and grappling means attached adjacent to the extended end of said cable and formed to capture the object.

7. A cargo handling apparatus as set forth in claim 6, further comprising:
   said roller means including a roller formed to receive the object having positioning means extending orthogonally from the ends thereof for laterally positioning the object adjacent said one end of said beam.

8. A cargo handling apparatus as set forth in claim 7, further comprising:
   cradle means formed to be mounted to the structure for receiving the object from said carrier means.

9. A cargo handling apparatus comprising:
   a track formed to be detachably mounted to a support structure;
   trolley means depending from said track for traversing the length thereof;
   carrier means including a yoke pivotally connected at one end thereof to said trolley means in a vertical plane and saddle means for gripping the cargo, pivotally attached to the other end of said yoke for angular movement within said plane; and
   roller means formed to be connected to the structure and extending outward therefrom below one end of said track for providing a fulcrum about which the cargo can rotate when transported along the length of said track.

10. A cargo handling apparatus as set forth in claim 9, further comprising:
    said carrier means including dash pot means operatively attached between said yoke and saddle means for controlling the rate of pivoting and for limiting the angular movement of said saddle means between an extended position and an orthogonal position toward said one end of said track.

11. A cargo handling apparatus as set forth in claim 10, further comprising:
    said saddle means including an upper section and a lower section hingedly connected to said upper section for gripping the cargo.

12. A cargo handling apparatus as set forth in claim 11, further comprising:
    said upper section including locking means having a slidable wedge at the distal end; and
    said lower section including a lip formed to register with said wedge for positive locking contact.

* * * * *